United States Patent
Beneux et al.

(10) Patent No.: US 10,951,119 B2
(45) Date of Patent: Mar. 16, 2021

(54) METHOD FOR CONTROLLING A SWITCHED ELECTRONIC CIRCUIT

(71) Applicants: SAFRAN ELECTRONICS & DEFENSE, Boulogne Billancourt (FR); UNIVERSITE DE LORRAINE, Nancy (FR)

(72) Inventors: Gaetan Beneux, Boulogne Billancourt (FR); Jamal Daafouz, Boulogne Billancourt (FR); Louis Grimaud, Boulogne Billancourt (FR); Pierre Riedinger, Boulogne Billancourt (FR)

(73) Assignees: SAFRAN ELECTRONICS & DEFENSE, Boulogne Billancourt (FR); UNIVERSITE DE LORRAINE, Nancy (FR)

( * ) Notice: Subject to any disclaimer, the term of this patent is extended or adjusted under 35 U.S.C. 154(b) by 0 days.

(21) Appl. No.: 16/616,205

(22) PCT Filed: May 22, 2018

(86) PCT No.: PCT/EP2018/063401
§ 371 (c)(1),
(2) Date: Nov. 22, 2019

(87) PCT Pub. No.: WO2018/215477
PCT Pub. Date: Nov. 29, 2018

(65) Prior Publication Data
US 2020/0212812 A1 Jul. 2, 2020

(30) Foreign Application Priority Data
May 22, 2017 (FR) ........................................ 1754538

(51) Int. Cl.
*H02M 3/335* (2006.01)
*H02M 1/00* (2006.01)

(52) U.S. Cl.
CPC ..... *H02M 3/33507* (2013.01); *H02M 3/33523* (2013.01); *H02M 2001/0012* (2013.01)

(58) Field of Classification Search
CPC ......... H02M 3/33507; H02M 3/33515; H02M 3/33523; H02M 3/335; H02M 2001/0003; H02M 2001/0012; H02M 2001/0025
See application file for complete search history.

(56) References Cited

U.S. PATENT DOCUMENTS

| | | | |
|---|---|---|---|
| 6,532,454 B1 * | 3/2003 | Werbos | G05B 13/027 706/14 |
| 8,838,257 B1 * | 9/2014 | Ito | G11B 19/28 360/78.05 |

(Continued)

OTHER PUBLICATIONS

B. Abdeldjabar et al., "Robust observer based active damping control for LCL filtered grid connected converters using LMI criterion", 2016 18th European Conference on Power Electronics and Applications (EPE'16 ECCE Europe), Jointly Owned by IEEE-PELS and EPE Association, Sep. 5, 2016, pp. 1-6.

(Continued)

*Primary Examiner* — Gustavo A Rosario-Benitez
(74) *Attorney, Agent, or Firm* — Muncy, Geissler, Olds & Lowe, P.C.

(57) ABSTRACT

To this end, the invention relates to a method for controlling a switched electronic circuit connecting an electrical voltage source u to a load R and forming a system having an output y and a plurality of operating modes i, at least some of which thus can be activated by following a switching rule o. According to the invention, the following steps are provided: —measuring state variables x of the system having equilibrium values $x^r$; —introducing at least one parameter p into the system, representing a measuring error of an electrical unknown of the operation of the circuit; —estimating the parameter from a state monitor and applying a (Continued)

Lyapunov function thereto; —deducing therefrom the equilibrium values of the system in order to obtain the control rule.

2 Claims, 3 Drawing Sheets

(56) References Cited

U.S. PATENT DOCUMENTS

| | | | | |
|---|---|---|---|---|
| 10,281,897 | B2* | 5/2019 | Di Cairano | G05B 19/106 |
| 2004/0239282 | A1* | 12/2004 | Yoneda | G05B 13/047 |
| | | | | 318/623 |
| 2011/0130889 | A1* | 6/2011 | Khajehoddin | H02J 3/383 |
| | | | | 700/298 |
| 2015/0070948 | A1* | 3/2015 | Johnson | H02J 3/38 |
| | | | | 363/41 |
| 2015/0131346 | A1* | 5/2015 | Kudoh | H02M 7/44 |
| | | | | 363/95 |
| 2017/0271984 | A1* | 9/2017 | Kohn | G05B 15/02 |
| 2018/0062531 | A1* | 3/2018 | Al-Hokayem | H02M 5/44 |
| 2020/0044576 | A1* | 2/2020 | Besselmann | H02P 25/022 |

OTHER PUBLICATIONS

C. Yfoulis et al., "Robust constrained stabilization of boost DC-DC converters through bifurcation anal", Control Engineering Practice, Dec. 11, 2014, pp. 67-82, vol. 35, Pergamon.

E. Maherzi et al., "Estimation of the State and the Unknown Inputs of a Multimodel with non Measurable Decision Variables", Journal of Applied Research and Technology, Jun. 1, 2014, pp. 422-434.

* cited by examiner

METHOD FOR CONTROLLING A SWITCHED ELECTRONIC CIRCUIT

TECHNICAL FIELD OF THE INVENTION

The present invention relates to the field of electronics and more particularly to controlling switched electronic circuits.

TECHNOLOGICAL BACKGROUND

Figure 1:
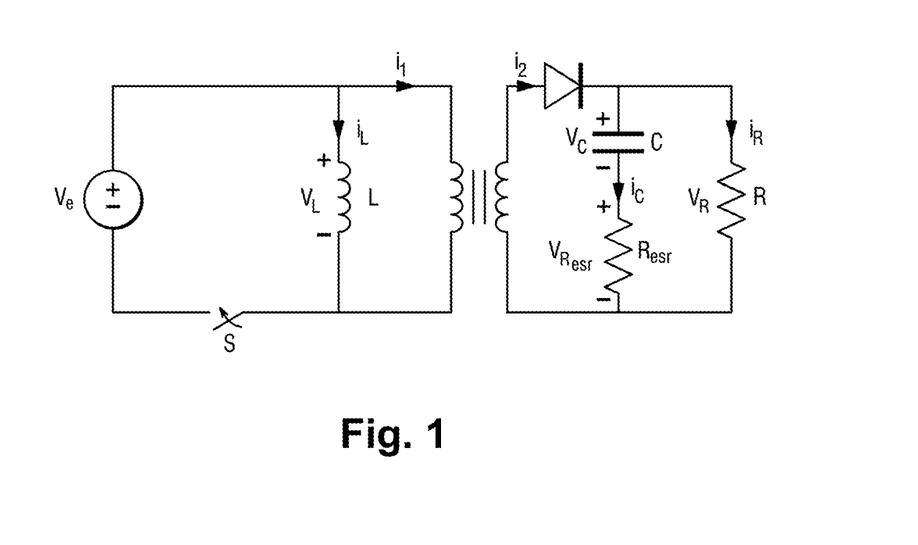
FIG. 1 is a simplified diagram of a flyback converter circuit.

The category of switched electronic circuits includes power converters. These devices find very widespread use in domestic and industrial applications for adjusting the power delivered by a power source to a load. A model flyback DC-to-DC converter is illustrated in FIG. 1. This converter comprises a primary circuit and a secondary circuit. The primary circuit comprises a voltage source that is connected in series with the primary winding of a transformer and a switch S. An inductor L is added to model the transformer. The secondary circuit comprises a secondary winding of the transformer that is connected by a diode D to a resistive load R. A capacitor C is connected in parallel with the secondary winding and the diode. A resistor $R_{esr}$ is added in series with the capacitor C to model losses due to the capacitor C. The transistor may be controlled, unlike the diode. The input voltage source $V_e$ is an ideal voltage source, i.e. without any series resistance and with unlimited power. The inductor of the primary L is also ideal, i.e. without any series resistance or magnetic losses. The diode and the transistor are ideal (the voltage in conduction mode is zero). The transformer is also assumed to be ideal.

The converter may operate in three modes:
Mode 1: the inductor L collects energy from the voltage source V. while the capacitor C supplies the load R with power.
Mode 2: the energy collected in the inductor L flows into the transformer, charges the capacitor C and supplies the load R with power.
Mode 3: the capacitor C supplies the load R with power.

If only Modes 1 and 2 are active during the cycle, the converter operates in CCM (continuous-conduction mode). If Mode 3 is active, the system works in DCM (discontinuous-conduction mode), i.e. the energy stored in the inductor in Mode 1 is completely transferred to the capacitor in Mode 2.

It is known practice to control these converters on the basis of a linear time-invariant (LTI) system model. These methods result in local stability. They are generally implemented with two loops, a fast current loop and a voltage loop.

The miniaturization of electronic components has made it possible to develop less expensive systems. Additionally, it is advantageous to work at low current levels so as to decrease losses. In this context, the switching frequency of the converter plays a fundamental role: the higher the frequency to which the switching frequency may be increased, the greater the extent to which the electronic parts may be miniaturized and losses decreased.

However this miniaturization presents robustness problems: the short response time as a result of the smaller components make the system more sensitive to variations.

It has been envisaged to take the explicit hybrid nature of these converters into account in the design of stabilization control laws which are based in particular on a switched affine system model.

One example of a switched affine system model applicable to such a flyback DC-to-DC converter and the corresponding operating conditions are described below. The notation will be as follows: the set composed of N first integers is denoted by $K=\{1, \ldots, N\}$ and if the simplex of dimension N−1 is $\Lambda_N := \{\lambda \varepsilon \mathbb{R}^N | \forall i \varepsilon K, \lambda_i > 0, \Sigma_{i=1}^N \lambda_i = 1\}$. The convex combination of a set of matrices $A=(A_1, \ldots, A_N)$ is denoted by $A(\lambda) = \Sigma_{i=1}^N \lambda_1 A_i$, where $\lambda \varepsilon \Lambda_N$. The identity matrix is denoted by I for all dimensions.

Such a converter is a switched system that can be modeled in the form of a switched state space as follows:

$$\dot{x} = A_\sigma x + B_\sigma u \quad (1)$$

where $x(t) \varepsilon \mathbb{R}^n$ is the state and $u(t) \varepsilon \mathbb{R}^m$ is the input that is assumed to be fixed ($u(t)=V_o$), wherein said input cannot be used as a control variable. The control command is formed by the switching law $\sigma: \mathbb{R}^n \to K$ which indicates the active mode at any given time. The state vector $x^T=[i_L, v_C]$ is composed of $i_L$ (current through the inductor L) and of $v_C$ (voltage across the terminals of the capacitor C). With reference to FIG. 1 and by using Kirchhoff's laws, the sets $A=\{A1, \ldots, A_N\}$ and $\beta=\{B1, \ldots, B^N\}$, where N=3, are given by:

$$A_1 = \begin{bmatrix} 0 & 0 \\ 0 & \frac{-1}{RCK} \end{bmatrix}, A_2 = \begin{bmatrix} \frac{n^2 R_{esr}}{LK} & \frac{nR_{esr}}{RLK} - \frac{n}{L} \\ \frac{-n}{CK} & \frac{-1}{RCK} \end{bmatrix} \quad (2)$$

$$A_3 = \begin{bmatrix} 0 & 0 \\ 0 & \frac{-1}{RCK} \end{bmatrix}$$

$$B_1 = \begin{bmatrix} \frac{1}{L} \\ 0 \end{bmatrix} \quad B_2 = \begin{bmatrix} 0 \\ 0 \end{bmatrix} \quad B_3 = \begin{bmatrix} 0 \\ 0 \end{bmatrix} \quad (3)$$

where $$K = \left(1 + \frac{R_{esr}}{R}\right).$$

Hereinafter, what is considered is the CCM configuration (only Modes 1 and 2 may be activated, hence N=2). The control problem, which is a switched system control problem, may also be considered by using, for the system defined in (1), a "convexified" representation given by:

$$\dot{x} = A(\lambda)x + B(\lambda)u \quad (4)$$

where $\lambda \varepsilon \Lambda_N$. Specifically, applying the density theorem guarantees that all of the trajectories of the convexified system defined in (4) may be reached by the switched system defined by equation (1) by means of sufficiently fast switching. This means that it is possible to study the convexified system and apply the results obtained to the switched system. Since the matrix $A(\lambda)$ is a Hurwitz matrix, it is possible to design stabilization strategies even though not all of the $A_i$ are stable. In this case, the equilibrium point of the system defined by equation (4), denoted by $x_e$, is found in the set $X_e$ such that, for fixed u, it is defined as:

$$X_e = \{x \in \mathbb{R}^N \mid x = -A^{-1}(\lambda)B(\lambda)u, \lambda \in \Lambda, A(\lambda) \text{ Hurwitz}\} \quad (5)$$

The stabilization strategies of this control law are based on an assumed perfect knowledge of all of the operating parameters of the converter, including the input voltage and the load.

By assuming that for every $\lambda \varepsilon \Lambda$, such that $A(\lambda)$ is Hurwitz, there is at least one index i, such that $\lambda_i \neq 0$ and $A_i$ is Hurwitz (Hypothesis 1), and by stating that the estimate $\tilde{x}$ of the state x has a value of $\tilde{x} = x - x^r$ where $x^r$ is the equilibrium point of this state, the Lyapunov function V is defined by:

$$V(x) := \tilde{x}^T P \tilde{x} \quad (6)$$

where $P = P^T > 0$, P being the Lyapunov matrix, the solution to Lyapunov equation (7) is $$A_i^T P + P A_i + \alpha_i P \geq 0 \; i = 1, \ldots, N \quad (7)$$

where $$\alpha(\lambda) = \sum_{i=1}^{N} \lambda_i \alpha_i, \begin{cases} \alpha_i > 0 & \text{if } A(\lambda) \text{ is Hurwitz} \\ \alpha_i = 0 & \text{else} \end{cases}$$

According to a first proposition (Proposition 1), what is considered is the switched system (1) and an equilibrium point $x^r \in X_e$ where $u = V_e$, $\lambda = \lambda^r$ and $A(\lambda^r)$ Hurwitz: for $P = P^T > 0$ solution to inequality (7), the equilibrium point $x^r$ is asymptotically stable overall with the following feedback law:

$$\sigma^*(x) = \arg\left[\min_{i \in K} [\tilde{x}^T P(A_i x + B_i u)]\right] \quad (8)$$

This is proven using a Lyapunov function $V(x, xr) = (x, xr) = \tilde{x}^T P \tilde{x}$. The derivative of V is denoted, along the trajectories $d = A(\lambda)x + B(\lambda)u$, by:

$$\dot{V}(x, x^r; \lambda) = 2\tilde{x}^T P(A(\lambda)x + B(\lambda)u)$$

Defining the Lyapunov matrix P gives:

$$\dot{V}(x, x^r; \lambda) = 2\tilde{x}^T P(a(\lambda)\tilde{x} + A(\lambda)x^r + B(\lambda)u) \geq -\alpha(\lambda)\tilde{x}^T P \tilde{x} + B(\lambda)(u)$$

For $\lambda = \lambda^r$, the term $A(\lambda)x^r + B(\lambda)u = 0$ and so:

$$\dot{V}(x, x^r, \lambda^r) = \sum_{i=1}^{N} \lambda_i^r 2\tilde{x}^T P(A_i x + B_i u) \quad (9)$$

$$\leq -\alpha(\lambda^r)\tilde{x}^T P \tilde{x}$$

Since $\alpha\lambda^r = \Sigma_{i=1}^{N} \lambda_i^r \alpha_i$ cannot be zero due to Hypothesis 1, it can be concluded that the choice of switching rule (8) leads to:

$$\dot{V}(x, x^r; \sigma^*) = 2\tilde{x}^T P(A_{\sigma^*} x + B_{\sigma^*} u) \geq -\sigma(\lambda^r)\tilde{x}^T P \tilde{x} > 0, \text{if } \tilde{x} \neq 0 \quad (10)$$

In practice, the control law (8) must be sampled and it has been shown that this sampling results in a static error, which is dependent on the sampling time T. With infinite switching frequency it is possible to decrease this static error to zero, but this is not realistic in a real-time application. Moreover, the method uses a Lyapunov function V which is dependent on the equilibrium point $x^r$. However, for power converters such as mentioned above, the equilibrium point $x^r$ is dependent on the load R and on the input voltage u, and if there are variations or uncertainties in these parameters, the robustness of stabilization of the equilibrium point must be analyzed.

OBJECT OF THE INVENTION

An object of the invention is to provide a stable control law for switched systems that takes unknown constant parameters into account. For example, in the case of power converters, the invention provides a stable control law even in the absence of knowledge of the input voltage and/or the output load.

DISCLOSURE OF THE INVENTION

To this end, the invention relates to a method for controlling a switched electronic circuit connecting a voltage source u to a load R and forming a system having an output y and a plurality of operating modes i, at least some of which can therefore be activated by following a switching law a. According to the invention, the following steps are provided:
measuring state variables x of the system having equilibrium values $x^r$;
introducing at least one parameter p into the system, which parameter is representative of a measurement error for an electrical operating unknown of the circuit;
estimating the parameter on the basis of a state observer;
deducing therefrom the equilibrium values of the system that are needed for control-law convergence.

More specifically, the method preferably comprises the steps of:
measuring state variables x of the system having equilibrium values $x^r$;
associating at least one error parameter p with at least one electrical operating unknown of the system so as to represent the system in the form $$\begin{cases} \dot{x} = A_\sigma x + B_\sigma u + G_\sigma p \\ \dot{p} = 0 \end{cases}$$

$A_\sigma$ being the state matrix, $B_\sigma$ the input matrix and $G_\sigma$ the parameter matrix in mode i controlled by the switching law $\sigma$;
estimating the values of the parameter p on the basis of a state observer of type $$\begin{cases} \dot{\hat{z}} = \overline{A}_\sigma \hat{z} + \overline{B}_\sigma u + L_\sigma(y - \hat{y}) \\ \hat{y} = \overline{C}\hat{z} \end{cases}$$

where z is a state vector such that $z^T = [x^T, p^T]$, $\tilde{C}$ is an observation matrix such that $\tilde{C} = [1 \; 0]$, and $L_\sigma$ is a gain matrix calculated by solving a linear matrix inequality (LMI) such that the error e with time between the state vector z and its estimate $\hat{z}$ tends exponentially toward zero;
deducing therefrom estimated equilibrium values $\hat{x}^r$ of the state variables x;
the switching law taking the following form $$\sigma^*(\hat{x}, \hat{x}^r, \hat{p}) = \arg\left[\min_{i}[w^T P(A_i \hat{x} + B_i u + G_i \hat{p})]\right]$$

where $w = (\hat{x} - \hat{x}^r)$ and P is the solution to the Lyapunov equation.

Thus, the proposed control law depends on estimating at least one parameter added to the model of the system to represent losses and variations in quantities that cannot be measured or in any case known exactly.

Other features and advantages of the invention will become apparent upon reading the following description of one particular nonlimiting implementation of the invention.

BRIEF DESCRIPTION OF THE DRAWINGS

Reference will be made to the appended drawings, in which.

DETAILED DISCLOSURE OF THE INVENTION

The invention is described here in terms of application to a flyback DC-to-DC converter. However, it goes without saying that the invention is applicable to any switched system.

Figure 2:
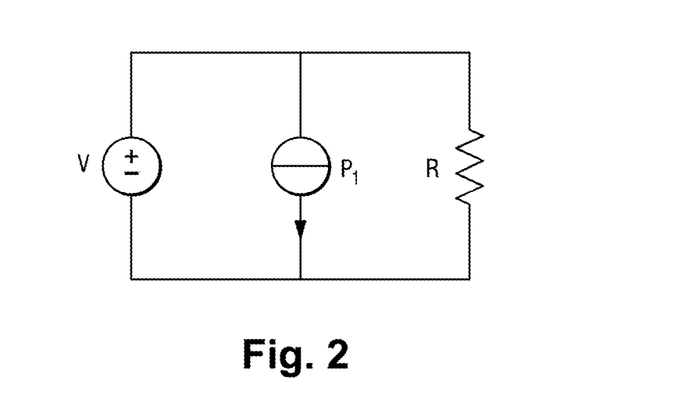
FIG. 2 is a schematic representation of the parameter $p_1$.
Figure 3:
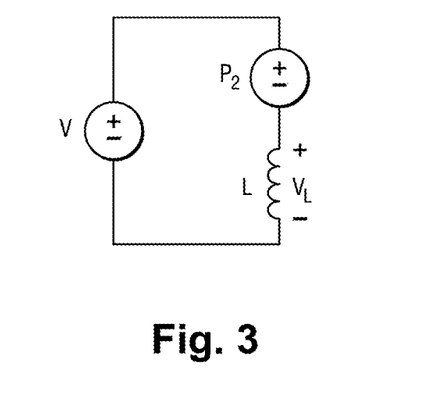
FIG. 3 is a schematic representation of the parameter $p_2$.

As mentioned above, in power converters it is common for there to be no input voltage measurement and no output load measurement available. The invention envisages taking into account two parameters that are representative of the missing input voltage measurement and of the missing output load measurement. These parameters are here related to the resistance R and to the voltage u, such as illustrated in FIGS. 2 and 3. The voltage parameter $p_2$ makes it possible to identify the error in the input voltage, as explained by equations (12) (in which $x_1$ represents the uncontrolled state variables), and the current parameter p, makes it possible to identify the error in the output load, as explained by equations (11).

$$i = \frac{v}{R} = p_1 + \frac{r}{R} \tag{11}$$

$$\hat{R} = \frac{1}{\frac{1}{R^*} + \frac{p_1}{v}}$$

$$\dot{x}_1 = \frac{v_L}{L} = \frac{u^* - p_2}{L} \tag{12}$$

$$\dot{u} = u^* - p_2$$

Figure 4:
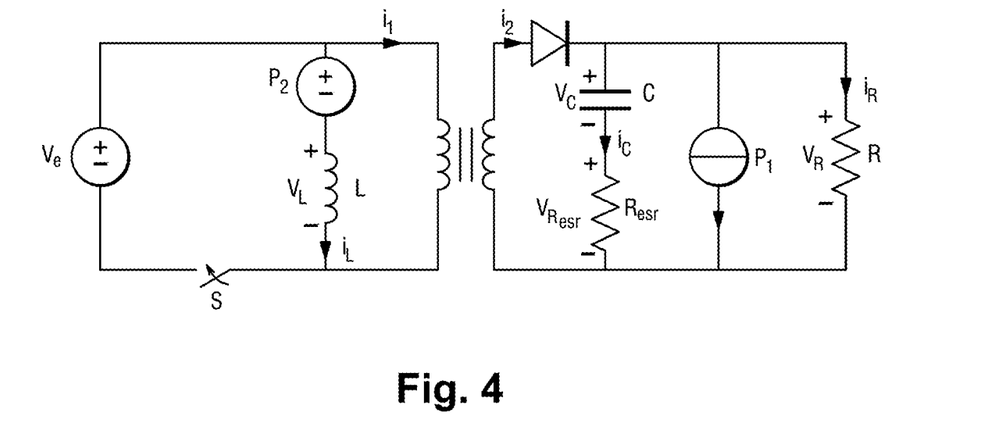
FIG. 4 shows the incorporation of the parameters $p_1$ and $p_2$ into this circuit.

For ease of understanding, these two parameters, given by equations (11) and (12), are added virtually to the converter, as shown in FIG. 4.

A perfect estimate of these parameters gives key information on the steady-state point which is unknown, a priori, in the absence of R and u measurements.

Similarly, the switched affine system describing the converter of FIG. 4 is given by:

$$\begin{cases} \dot{x} = A_\sigma x + B_\sigma u + G_\sigma p \\ \dot{p} = 0 \end{cases} \tag{13}$$

where p is an unknown-parameter vector, A is the state matrix, B is the input matrix and G is the parameter matrix.

To estimate this vector, use is first made of an augmented state vector $z^T = [x^T, p^T]$ to rewrite the system defined by the equations (13) as:

$$\begin{cases} \dot{z} = \tilde{A}_\sigma z + \tilde{B}_\sigma u \\ y = \tilde{C}z \end{cases} \tag{14}$$

where $\tilde{A}$ is the augmented state matrix and $\tilde{B}$ is the augmented input matrix, which are defined as $$\tilde{A}_1 = \begin{bmatrix} A_t & G_t \\ 0 & 0 \end{bmatrix} \tilde{B}_1 = \begin{bmatrix} B_t \\ 0 \end{bmatrix}$$

$$G_1 = \begin{bmatrix} 0 & \frac{-1}{L} \\ \frac{-1}{CK} & 0 \end{bmatrix} G_2 = \begin{bmatrix} \frac{nR_{esr}}{LK} & \frac{-1}{L} \\ \frac{-1}{CK} & 0 \end{bmatrix},$$

$$G_3 = \begin{bmatrix} 0 & 0 \\ \frac{-1}{CK} & 0 \end{bmatrix}$$

Without losing generality, $\tilde{C} = [C\ 0]$ is used for the output matrix. In the present case, C=I but the approach resulting in the invention is also applicable when the state x is not available for measurement. The set of equilibrium points of the system defined by formula (14) is then:

$$Z_e = \{z \in R^N | \tilde{A}(\lambda)z + \tilde{B}(\lambda)u = 0\} \tag{15}$$

It is assumed that $z^r \in Z_e$ and $\lambda = \lambda^r$, such that $$\tilde{A}(\lambda^r)z^r + \tilde{B}(\lambda^r)V_e = 0 \tag{16}$$

An augmented state observer is used to retrieve the unknown parameters. The integer-order observer is defined by:

$$\begin{cases} \dot{\hat{z}} = \tilde{A}_\sigma \hat{z} + \tilde{B}_\sigma u + L_\sigma(y - \hat{y}) \\ \hat{y} = \tilde{C}\hat{z} \end{cases} \tag{17}$$

By inserting the error e between the vector z and its estimate $\hat{z}$ such that $e(t) = z(t) - \hat{z}(t)$, its dynamic behavior is given by:

$$\dot{e} = (\tilde{A}_\sigma - L_\sigma \tilde{C})e \tag{19}$$

The gains $L_i$ must be designed to satisfy $\lim_{t \to \infty}[e(t)] = 0$, and to ensure that this is achievable using the following conventional result.

According to a second proposition (Proposition 2): if there is a positive definite matrix $P_{obs} = P_{obs}^T > 0$, matrices $R_i$ and scalars $\gamma_i > 0$ satisfying, for every $i \in K$:

$$\tilde{A}_t^T P_{obs} + P_{obs}\tilde{A}_t - \tilde{C}^T R_t^T - R_t \tilde{C} + \gamma_t P_{obs} < 0 \tag{20}$$

then the switched systems meeting equation (19) are, overall, exponentially stable, with a decrease that is at least equal to $\gamma=_{1\in K}^{min}\gamma_i$.

This is proven by analyzing the Lyapunov function $V(e)=e^T P_{obs} e$ and the well-known variable change $R_i=P_{obs}L_i$.

If equation (20) allows a solution with $P_{obs}=P_{obs}^T>0$, this means that $V=e^T P_{obs} e$ is a Lyapunov function and that $\lim_{t\to\infty}[e(t)]=0$ for any switching rule.

This makes it possible to construct a stabilization switching control law that is based on a parameter and state estimate by modifying switching law (8) to guarantee overall asymptotic stabilization.

The main difficulty is associated with determining the operating point based on an estimate $\hat{p}$ of p. To explain how to get there, the following definitions and hypotheses are required.

Definition 1: for fixed $\xi \geq 0$, the set $\Lambda_{ref}(\xi)=\{\lambda\in\Lambda: A(\lambda+v)$ is Hurwitz for every $v\in\beta(0,\xi)\}$.

Definition 2: for fixed $\xi \geq 0$, the set of accessible equilibrium points is defined as:

$$X_{ref}(\xi) = \left\{ x^r \in \mathbb{R}^N : x^r = -A(\lambda)^{-1}[B(\lambda)G(\lambda)]\begin{bmatrix} u \\ p \end{bmatrix}, \right.$$

$$\left. (p,\lambda) \in \mathbb{R}^{n_p} \times A_{ref}(\xi) \right\}$$

$x_2$ is used as the controlled portion of the state variables and $x_1$ the remaining state variables, such that $x^T=(x_1^T, X_2^T)$. Without losing generality, it is assumed that $x_1=C_{x1}x$ and $x_2=C_{x2}x$. The function $\varphi$ in $C^\infty$ is considered as:

$$\varphi(\lambda, x_1, x_2, u, p) = A(\lambda)x + B(\lambda)u + G(\lambda)p \quad (21)$$

For $\lambda \in \Lambda_{ref}(\xi)$, meaning that $A(\Lambda)$ is Hurwitz and, consequently, invertible, there is, for every fixed u and p, a single x, such that $$\varphi(\Lambda, x_1, x_2, u, p) = 0$$

Hypothesis 2: for every $x_2^r \in X_{ref}(\xi)|x_2, u, p$, there is a single class function $C^1=_{(1,2)}$ such that $$x_1^T = \phi_1(x_2^r, u, p) \in X_{ref}(\xi)|_{x_1} \quad (22)$$

$$\Lambda^r = \phi_2(x_2^r, u, p) \in \Lambda_{ref}(\xi) \quad (23)$$

which satisfies the following relationship:

$$\psi(\lambda, x_1, x_2, u, p) = \psi(\lambda^r, x_1^r, x_2^r, u, p)$$
$$= 0$$

Moreover, it is assumed that there is a constant $\eta(x^r, u, \xi) > 0$ such that $$\left\| \frac{\partial \phi_1(x_2^r, u, \cdot)}{\partial p} \right\|_\infty \leq \eta(x_2^r, u, \xi) \quad (24)$$

The parameterization effected by equations (22) and (23) plays an important role in the proposed approach, since it makes it possible to estimate the reference point based on an estimate $\hat{p}$ of the parameters p and a reference (or equilibrium value) $x_2^r$ for the controlled portion $x_2$ of the state variables. This leads to $$\hat{x}_1^r = \varphi_1(x_2^r, u, \hat{p}) \quad (25)$$

$$\hat{\Lambda}^r = \varphi_2(x_2^r, u, \hat{p}) \quad (26)$$

From this, it is assumed that:

$$\hat{x}^r = \begin{bmatrix} \hat{x}_1^r \\ x_2^r \end{bmatrix}.$$

The dynamic behavior of $\hat{x}_1^r$, for fixed $x_2^r$ and u, is:

$$\dot{\hat{x}}_1^r = \frac{\partial \phi_1}{\partial p} \dot{\hat{p}} \quad (27)$$

$$= \frac{\partial \phi_1}{\partial p} (\dot{\hat{p}} - \dot{p}) \quad (28)$$

$$\dot{x}_2^r = 0 \quad (29)$$

By assuming that $\dot{p}=0$ and by replacing $\dot{p}$ with its expression (18), what is obtained is:

$$\dot{\hat{x}}_1^r = \frac{\partial \phi_1}{\partial p} L(\lambda^r) \tilde{C} e \quad (30)$$

$$\dot{x}_2^r = 0 \quad (31)$$

This leads to the following theorem.

Theorem 1: by considering the switched affine system with unknown parameters such as defined in (13), by writing $x^{rT}=(x_1^{rT}, x_2^{rT})$ with $x_1^r=\theta_1(x_2^r, u, p)$ and by assuming that Proposition 1 and Proposition 2 are satisfied, what is obtained, according to Hypothesis 1 and Hypothesis 2 and for every $x_2^r \in X_{ref}(\lambda)|_{x_2}$ where $\xi > 0$, is the feedback law defined by:

$$\sigma^*(\hat{x}, \hat{x}^r, \hat{p}) = \arg\left[\min_i [w^T P(A_i \hat{x} + B_i u + G_i \hat{p})]\right] \quad (32)$$

where $w = (\hat{x} - \hat{x}^r)$.

This feedback law guarantees overall asymptotic stability of the equilibrium point $x^r$ as can be proven below.

It is taken from Proposition 2 that the observation error converges toward zero for any switching rule and, from Proposition 1, the Lyapunov matrix P and the scalars $\alpha_i$. For $\hat{\lambda}^e \in \Lambda_{ref}(\xi)$, equation (7) gives:

$$2\omega^T P A(\hat{\Lambda}^r)\omega + \alpha(\hat{\Lambda})\omega^T P\omega \leq 0 \quad (33)$$

where $\alpha(\hat{\Lambda}^r) = \sum_{i=1}^N \hat{\Lambda}_i^r \alpha$.

With $A(\hat{\Lambda}^r)\hat{x}^r + B(\hat{\Lambda}^r)u + G(\hat{\Lambda}^r)\hat{p} = 0$ and $\hat{\Lambda}_r$ defined in equations (25) and (26), giving:

$$2\omega^T P(A(\hat{x}^r)\hat{x} + B(\hat{\Lambda}^r)u + G(\hat{\Lambda}^r)\hat{p}) \leq -\alpha(\hat{\Lambda}^r)\omega^T P\omega$$

$$\sum_{i=1}^N \hat{\Lambda}_i^2 \omega^T P(A_i \hat{x} + B_i u + G_i \hat{p}) \leq -\alpha(\hat{\Lambda}^r)\omega^T P\omega$$

Since $\alpha(\hat{\Lambda}^r) = \sum_{i=1}^N \hat{\Lambda}_i^r \alpha_i$ cannot be zero according to Hypothesis 1, it is possible to conclude that control law (32) leads to:

$$2\omega^T P(A_\sigma + \hat{x}B_\sigma \cdot u + G_{\sigma \cdot \hat{P}}) \leq -\alpha(\hat{\lambda}^r)\omega^T P\omega \quad (34)$$

$$< 0, \text{ if } \omega \neq 0 \quad (35)$$

By taking the Lyapunov function V defined in equation (6) and by using $(\hat{x}, \hat{x}^r, \Lambda)$ instead of $x, x^r$, what is obtained is:

$$\dot{V}(\hat{x}, \hat{x}^r, \lambda) = 2\omega^T P\left(A(\lambda)\hat{x} + B(\lambda)u + G(\lambda)\hat{p} + \left(\bar{L}(\lambda) - \frac{\partial \phi_1}{\partial p}L(\lambda)\right)\tilde{C}e\right)$$

If the following term is added to each side of inequality (34)

$$2\omega^T P\left(\bar{L}_{\sigma^*} - \frac{\partial \phi_1}{\partial p}L_{\sigma^*}\right)\tilde{C}e$$

what is obtained is:

$$\dot{V}(\hat{x}, \hat{x}^r; \sigma^*) \leq -\alpha(\hat{\lambda}^r)\omega^T P\omega + 2\omega^T P\left(\bar{L}_{\sigma^*} - \frac{\partial \phi_1}{\partial p}L_{\sigma^*}\right)\tilde{C}e \quad (36)$$

Since e converges exponentially toward 0 for any switching rule and therefore, in particular, for the switching rules resulting from control law (32), where $\bar{\gamma} = \min_i \gamma_i$, there is $K > 0$, $$\|e(t)\| \leq Ke^{-\bar{\gamma}t}\|e_0\|$$

Hence:

$$\dot{V}(\hat{x}, \hat{x}^r, \sigma^*) \leq -\alpha(\hat{\lambda}^r)\omega^T P\omega + \quad (37)$$

$$2\beta_{max}\|\omega\| \times \left(\|\bar{L}_{\sigma^*}\| + \left\|\frac{\partial \phi_1(x_2^r, u, \cdot)}{\partial p}\right\|_\infty \|L_{\sigma^*}\|\right) \times \|\tilde{C}\|Ke^{-\bar{\gamma}t}\|e_0\|$$

where $\beta_{max}$ is the maximum eigenvalue of P.
A condition sufficient to guarantee $$\dot{V}(\hat{x}, \hat{x}^r; \sigma^*) \leq -\frac{\alpha(\hat{\lambda}^r)}{2}\omega^T P\omega < 0$$

is $$\|\omega\| > \max_i 4 \frac{\beta_{max}}{\alpha_{min}\beta_{min}}\left(\|\bar{L}_i\| + \left\|\frac{\partial \phi_1(x_2^r, u, \cdot)}{\partial p}\right\|_\infty \|L_i\|\right) \times \|\tilde{C}\|Ke^{-\bar{\gamma}t}\|e_0\|$$

where $\beta_{min}$ is the minimum eigenvalue of P and $$\alpha_{min} = \min_{\lambda \in \Lambda_{ref}(\xi)} \alpha(\lambda)$$

It should be noted that $\alpha_{min} > 0$ for $\xi > 0$ according to Hypothesis 1 and by defining $\Lambda_{ref}(\xi)$.

Since there is $\eta(x_2^r, u, \xi) > 0$, such that $$\left\|\frac{\partial \phi_1(x_2^r, u, \cdot)}{\partial p}\right\|_\infty \leq \eta(x_2^r, u, \xi),$$

it can be concluded that there is a constant $M(x_2^r, u, \xi) > 0$, such that if $$\|\omega\| > (x_2^r, u, \xi)e^{-\bar{\gamma}t}\|e_0\|$$

then, $$\dot{V}(\hat{x}, \hat{x}^r; \sigma^*) \leq -\frac{\alpha(\hat{\lambda}^r)}{2}\omega^T P\omega < 0$$

Since it is possible to state that:

$\forall e_0, \forall e, \exists t_2$, such that $Me^{-\bar{\gamma}t}\|e_0\| < \varepsilon, \forall t < t_2$, there is necessarily $$\dot{V}(\hat{x}, \hat{x}^r; \sigma^*) \leq -\frac{\alpha_{min}}{2}w^T Pw < 0$$

for any w, such that $\|w\| > \varepsilon$. This means that for any w(0), there is $t_3$, such that:

$$\|w(t)\| \leq \varepsilon$$

for every $t > t_3$.

It can therefore be concluded that w converges asymptotically toward 0. Since e also converges toward zero, there is:

$$\hat{x} \to x \to \hat{x}^r = \begin{bmatrix} \hat{x}_1^r \\ x_2^r \end{bmatrix}$$

where $x_1^R = {}_1(x_2^r, r, p)$, since $\hat{p} \to p$.

The conditions in Hypothesis 2 may be relaxed as follows.

A third hypothesis (Hypothesis 3) is then formulated: it is assumed that the application $\theta = (\theta_1, \theta_2)$ in Hypothesis 2 is no longer valid for every p but only for any p in a closed convex domain denoted by $P(x_2, u, \xi)$ dependent on $u, x_u$ and $\xi$. It is also assumed that the nominal value of parameter p is included in $P(x_2^r, u, \xi)$ and $\Lambda = x2(x_2^r, u, p) \in \Lambda_{ref}(\xi)$.

According to a third proposition (Proposition 3): according to Hypothesis 3, Theorem 1 remains true if the operating point $(\hat{x}_1^r, \hat{\Lambda}^r)$ is such that $$\hat{x}_1^r = \phi_1(x_2^r, u, \Pi\hat{p}) \quad (38)$$

$$\hat{x}^r = \phi_2(x_2^r, u, \Pi\hat{p}) \quad (39)$$

where $\Pi\hat{p}$ is the orthogonal projection of $\hat{p}$ on $P(X_2^r, u, \xi)$. This can be proven in the following way. Since $P(x_2^r, u, \xi)$ is closed and convex, the orthogonal projection $\Pi\hat{p}$ of $\hat{p}$ on $P(x_2^r, u, \xi)$ is continuous. The function $\theta$ is considered and the projection $\Pi$ is used, such that $\hat{p} \to \theta_i(x_2^r, u, \Pi\hat{p})$, $i=1,2$ for fixed $x_2^r$ and u. Since $\hat{\Lambda} = \theta_2(x_2^r u, \Pi\hat{p}) \in \Lambda_{ref}(\xi)$, it is seen that $$\hat{x}_1^r = \phi_1\left(x_2^r, u, \prod \hat{p}\right) \quad (40)$$

$$= -C_{x1}A(\hat{\lambda}^r)^{-1}[B(\hat{\lambda}^r)G(\hat{\lambda}^r)]\begin{bmatrix} u \\ \prod \hat{p} \end{bmatrix}$$

which is well defined as $A(\hat{\Lambda}^r)$, is invertible.

The projection 1 makes it possible to calculate a reference point $(\hat{x}_1^r, x_2^r)$ for any t. Of course, the operating point $\hat{x}^r, (\hat{x}_1^r, x_2^r)$ calculated in this way with a projection of p is not an equilibrium point of the system when $\hat{p} \in P(x_2^r, u, \xi)$.

Since $\hat{p} \in P(x_2^r, u, \xi)$, the convergence of the error e toward zero for any switching rule and the continuity of θ guarantee that there is a time $t_1(e_o)$, such that $\hat{\Lambda}^r = \theta_2(x_2^r, u, \hat{p}) \in \Lambda_{ref}(\xi)$ and $\hat{p} \in P(x_2^r, u, \xi)$ for every $t > t_1$, as long as P is sufficiently close to p. For every $t > t_1$, proof is reached by following steps similar to those taken to prove Theorem 1.

Thus, to drive a flyback converter such as described, it is sufficient to combine the converter with a unit for controlling the switch which is programmed to implement the control law of Theorem 1.

A numerical example will now be described.

A flyback converter described by equation (1) is chosen, this depending on six parameters having the following nominal values:

$$u=28V, R=75\Omega, L=200\mu H, C=2.6\mu F, R_{esr}=0.02\Omega \text{ and } n=2.$$

The target equilibrium point is written as $x_2^r = 15V$. It is assumed that the converter is working with said nominal values and, having robustness as the primary objective, it is also assumed that $x_1$ and $x_2$ are measured. It is also assumed that the load R and the input voltage $V_e$ may change and that these parameters are not measured.

As hypothesis, what is considered is a piecewise constant function with variations of between 15Ω and 150Ω for the load and between 44 V and 28 V for the input voltage.

It is verified that this system satisfies Hypothesis 3. For a given value $x_2^r$, and by calculating $\hat{p}$ on the basis of (17), what is obtained is $\Lambda^r$:

$$\begin{cases} \lambda_1^r = \dfrac{(R_{esr}+R_o)(p_2+nx_2^r)}{(R_{esr}+R_o)V_e + nR_o x_2^r - nR_{esr} R_o p_1} \\ \lambda_2^r = 1 - \lambda_1^r \end{cases} \quad (41)$$

For a given value $\xi > 0$, the set $\Lambda_{ref}(\xi)$ is given by $$\begin{cases} \lambda_1 \in [0 \quad 1 - \xi[ \\ \lambda_2 = 1 - \lambda_1 \end{cases}$$

since only $A_1$ is not Hurwitz. It is then straightforward to verify, on the basis of equations (41), that if $P(x_2^r, u, \xi)$ is defined by:

$$-p_{1max} \leq p_1 < p_{1max} < p_{1lim}$$

$$-nx_2^r \leq p_2 \leq a(\xi)p_1 + b(\xi)$$

where $$a(\xi) = -(1-\xi)\dfrac{nR_{esr}R}{R_{esr}+R}, \quad b(\xi) = (1-\xi)V_e - nR_{esr}x_2^r$$

and $$p_{1lim} = \dfrac{(R_{esr}+R)V_e + nRx_2^r}{nR_{esr}R},$$

then $\Lambda_1^r \in \Lambda_{ref}(\xi)$ and hence $x_1^r$ is well defined for the set P. Moreover, since the set P is compact, inequality (24) is satisfied, as is, consequently, Hypothesis 3 for the application under consideration. In practice, $p_{1max} = 10^3$, which value is very far from the admissible physical values for p.

LMI conditions (7) are solved to obtain the matrix P with $\alpha_1 = 0$, $\alpha_2 = 35$ and $\xi = 0,1$:

$$P = \begin{pmatrix} 74291 & 36 \\ 36 & 993 \end{pmatrix} \quad (43)$$

LMI conditions (20) are also solved to obtain the gains $L_i$ for the observer with $\gamma_1 = \gamma_2 = 3,3 \times 10^4$. In this application, a gain of the current observer is obtained for each mode:

$$L_i = \begin{pmatrix} 362 & 19 \\ 19 & 1569 \\ 243 & -3153 \\ -3153 & -243 \end{pmatrix}, i \in \mathbb{K} \quad (44)$$

Figure 5:
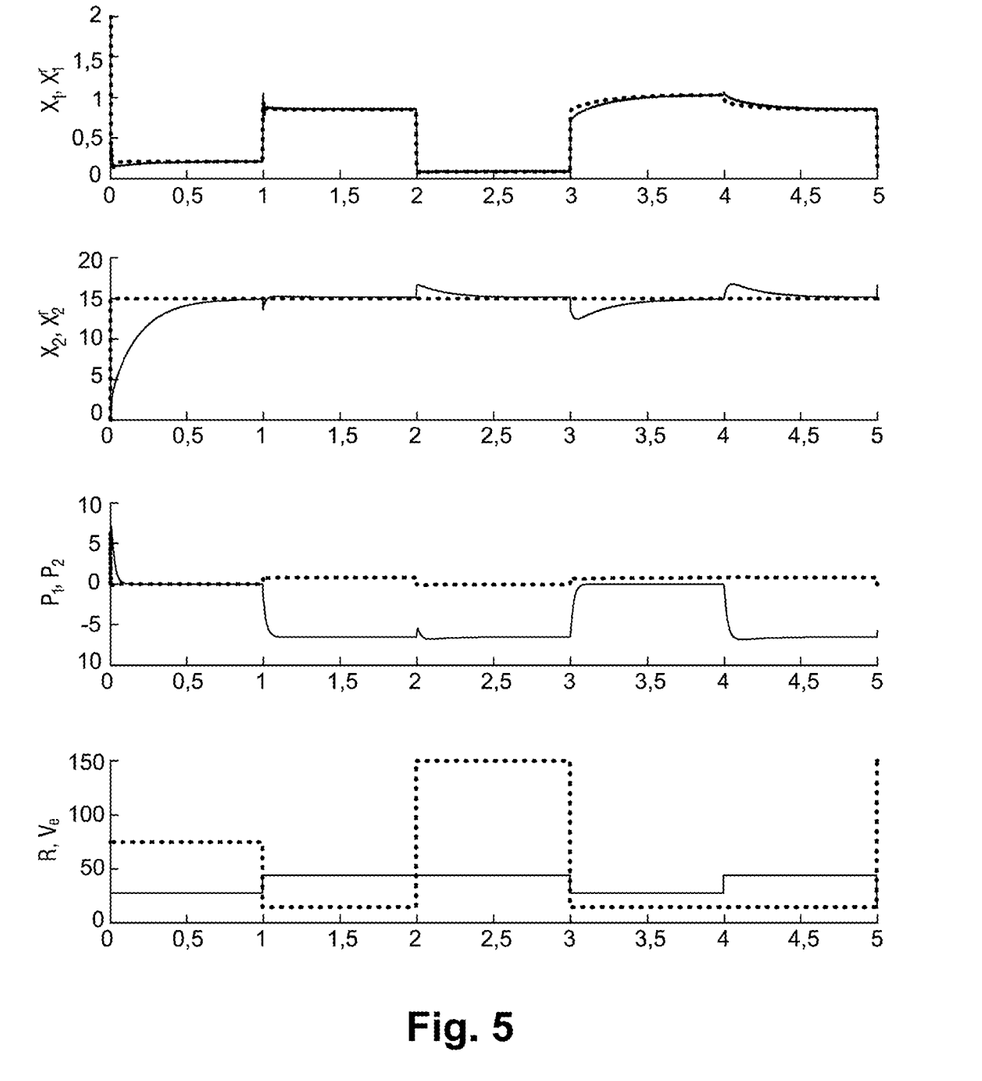
FIG. 5 shows curves illustrating a stepwise variation in R and $V_e$ with the switching-and-observing control method of the invention.

By applying the robust and adaptive control of Theorem 1, the results shown in FIG. 5 are obtained. To see the behavior of the system in a closed loop, in the case of all of the parameters being perfectly known, the simulation scenario begins with the nominal values $x_2$. The variations in R and U are introduced after 1 ms. FIG. 5 shows a stepwise variation in R and $V_e$ with the switching-and-observing control method. Curves 1 and 2 show $x_1, \hat{x}_1^r$ and $x_2, x_2^r$, respectively, while curve 3 shows the estimation parameters $p_1$ and $p_2$ and curve 4 shows the variations in U and R. Times are given in ms.

It is apparent in these curves that parameter p converges toward a new value each time R or $V_e$ changes, and that the controlled output, $x_2$, exhibits robustness faced with variations in R and $V_e$. The control law clearly rejects the disruption in x2 and the current x1 is well adjusted to the variations.

It is worth noting here that the control method according to the invention is not based on a linear approximation of the system. The control method is implemented directly on the model of the switched system by taking non-linearities into account, which makes it possible to guarantee the overall asymptotic stability of the corrector.

Moreover, stability is demonstrated using the observer in the control loop, which is unlike the general practice of the prior art.

Generally, moreover, the control method is developed under the assumption that the observer has converged. However, it is proven here that the observer does not need to have already converged to guarantee overall asymptotic stability.

The control method according to the invention is thus particularly advantageous.

As seen above, the control method makes it possible to obtain a stable control law even in the absence of exact knowledge of all of the operating parameters of the switched electronic circuit.

Here, neither the input voltage nor the output load is measured: the observers used allow these parameters to be taken into account.

Control that is self-adaptive with respect to variations in operating parameters of the switched electronic circuit is thus obtained without it being necessary to measure said operating parameters. The switched electronic circuit is simplified and its cost decreased by removing the difficulties related to obtaining accurate measurements of the operating parameters.

It should be noted that the control law is stable over a wider operating range than the stability range obtained with the control laws of the prior art (outside linear domain).

Moreover, this stability, obtained by implementing the control method according to the invention, can be proven. Being able to prove stability is a great asset in applications requiring certification work, and in particular in aerospace applications. Without such a proof of stability, even if the circuit appears to operate perfectly well, it is effectively impossible to guarantee stability over the entire operating range, and hence it is impossible to certify and to authorize a device implementing such a circuit for flight.

Of course, the invention is not limited to the embodiments described but includes all variants that come within the scope of the invention as defined by the claims.

The invention claimed is:

1. A method for controlling a switched electronic circuit connecting a voltage source u to a load R and forming a system having an output y and a plurality of operating modes i, at least some of which can therefore be activated by following a switching law σ, characterized in that the method comprises the steps of:
    measuring state variables x of the system having equilibrium values $x^r$;
    associating at least one error parameter p with at least one electrical operating unknown of the system so as to represent the system in the form $$\begin{cases} \dot{x} = A_\sigma x + B_\sigma u + G_\sigma p \\ \dot{p} = 0 \end{cases}$$

$A_\sigma$ being the state matrix, $B_\sigma$ the input matrix and $G_\sigma$ the parameter matrix in at least one of the modes i controlled by the switching law σ;
    estimating the values of the parameter p on the basis of a state observer of type $$\begin{cases} \dot{\hat{z}} = \overline{A}_\sigma \hat{z} + \overline{B}_\sigma u + L_\sigma(y - \hat{y}) \\ \hat{y} = \overline{C}\hat{z} \end{cases}$$

where z is a state vector such that $z^T=[x^T,p^T]$, $\tilde{C}$ is an observation matrix such that $\tilde{C}=[I 0]$, I is an identity matrix, and, and $L_\sigma$ is a gain matrix calculated by solving a linear matrix inequality (LMI) such that the error e with time between the state vector z and estimate $\hat{z}$ thereof tends asymptotically toward zero;
    deducing therefrom estimated equilibrium values $\hat{x}^r$ of the state variables x;
    the switching law taking the following form $$\sigma^*(\hat{x}, \hat{x}^r, \hat{p}) = \arg\left[\min_i [w^T P(A_i \hat{x} + B_i u + G_i \hat{p})]\right]$$

where $w=(\hat{x}-\hat{x}^r)$ and P is the solution to the Lyapunov equation.

2. The method as claimed in claim 1, wherein the switched electronic circuit is a converter comprising a primary circuit and a secondary circuit, the primary circuit comprising the voltage source that is connected in series with a primary winding of a transformer and with a switch, an inductor L being connected in parallel with the primary winding and being under a voltage $v_L$, the secondary circuit comprising a secondary winding of the transformer that is connected by a diode to a resistive load R, the method comprising the step of defining a current parameter $p_1$ to represent the error in the output load such that $$i = p_1 + \frac{v}{R}$$

i is a current in a conductor, v is a voltage in the conductor, $p_2$ to represent an error in the input voltage such that $$\dot{x}_1 = \frac{v_L}{L} = \frac{u - p_2}{L}$$

where $x_1$ represents the uncontrolled state variables.

* * * * *